United States Patent
Mosek et al.

(10) Patent No.: US 7,921,270 B2
(45) Date of Patent: Apr. 5, 2011

(54) METHODS AND SYSTEMS FOR CONTROLLING ACCESS TO A STORAGE DEVICE

(75) Inventors: Amir Mosek, Tel Aviv (IL); Itzhak Pomerantz, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 566 days.

(21) Appl. No.: 11/860,546

(22) Filed: Sep. 25, 2007

(65) Prior Publication Data
US 2008/0086613 A1    Apr. 10, 2008

Related U.S. Application Data

(60) Provisional application No. 60/828,222, filed on Oct. 5, 2006.

(51) Int. Cl.
*G06F 12/00*    (2006.01)
(52) U.S. Cl. .. 711/163; 711/103; 711/164; 711/E12.091
(58) Field of Classification Search ................. None
See application file for complete search history.

(56) References Cited

U.S. PATENT DOCUMENTS

| | | | |
|---|---|---|---|
| 3,744,034 A * | 7/1973 | Paul | 711/164 |
| 4,652,990 A * | 3/1987 | Pailen et al. | 705/56 |
| 5,469,564 A | 11/1995 | Junya | |
| 6,389,427 B1 | 5/2002 | Faulkner | |
| 6,622,220 B2 | 9/2003 | Yoshida et al. | |
| 6,823,398 B1 | 11/2004 | Lee et al. | |
| 7,165,152 B2 | 1/2007 | Blumenau et al. | |
| 2003/0061504 A1 | 3/2003 | Sprigg et al. | |
| 2006/0265605 A1 | 11/2006 | Ramezani | |
| 2007/0174897 A1 | 7/2007 | Rothman et al. | |

FOREIGN PATENT DOCUMENTS

| | | |
|---|---|---|
| JP | 2000/137581 | 5/2000 |
| JP | 2000137581 | 5/2000 |
| JP | 2007/102761 | 4/2007 |
| JP | 2007102761 | 4/2007 |

OTHER PUBLICATIONS

TGC Glossary of Technical Terms, printed Sep. 23, 2007 (5 pages) https://www.trustedcomputinggroup.org/groups/TCG_Glossary.
"What is MTP?", dated Oct. 2004 (2 pages) http://www.directionsonmicrosoft.com/sample/DOMIS/update/2004/10oct/1004mpumsf_sb.htm.

* cited by examiner

*Primary Examiner* — Shawn X Gu
(74) *Attorney, Agent, or Firm* — Brinks Hofer Gilson & Lione

(57) ABSTRACT

The present invention discloses systems and methods for communicating with a storage device configured to store signed program files, the method including the steps of: generating, by a program process, a respective command number associated with a process command; issuing, by the program process, the process command with the respective command number to the storage device; and according to the respective command number, verifying, by the storage device, whether the process command originated from a trusted program process launched from the program files stored in the storage device. Preferably, the step of verifying includes: generating, by the storage device, a respective initial command number associated with a requested program file; and attaching, by the storage device, the respective initial command number to a copy of the requested program file.

23 Claims, 6 Drawing Sheets

METHODS AND SYSTEMS FOR CONTROLLING ACCESS TO A STORAGE DEVICE

This patent application claims priority under 35 U.S.C. §119(e) to U.S. Provisional Application No. 60/828,222, filed Oct. 5, 2006, which is hereby incorporated by reference in its entirety.

FIELD AND BACKGROUND OF THE INVENTION

The present invention relates to systems and methods for limiting access, to data in a storage device, only to privileged resident-program files that have been launched from the storage device.

Software security is a well-known area in the art of computer engineering, especially in systems having a host system and a storage device. In many cases, there is a need to protect the storage device from damage to the data caused by programs, running on the host system, accessing the storage device without authority due to innocent errors, negligence, or malicious intent (e.g. computer viruses and worms).

One well-known implementation of software-security technology is code authentication (known in the industry as "signed code"). Signed code does not provide protection against data being damaged in the storage device because:
(1) a signed program does not necessarily comply with regulations regarding access to the storage device; and
(2) since the host system may run signed and unsigned programs with different levels of access permissions, a malicious unsigned program can "take over" a signed program and use the permissions of the signed program to cause damage to the storage device.

All prior-art methods for software security are based on a decision point made prior to program launch, whereby the host system determines whether a given application should be trusted by the storage device.

Although the computing power and information-security measures of the host system are typically adequate, the storage device's security remains completely dependent on the host system. The storage device has no way to recognize unauthorized commands sneaking through the host system's security protection.

In the prior art, Rothman et al, US Patent Publication No. 20070174897 (hereinafter referred to as Rothman '897), teaches a method and apparatus for protecting data stored in data storage devices. Sprigg et al., US Patent Publication No. 20030061504 (hereinafter referred to as Sprigg '504), teaches application-level access-privilege to a storage area on a computer device. Ramezani et al, US Patent Publication No. 20060265605 (hereinafter referred to as Ramezani '605), teaches a system and method for managing security of a memory device.

Lee et al., U.S. Pat. No. 6,823,398 (hereinafter referred to as Lee '398), teaches file-system management embedded in a storage device. Yoshida et al, U.S. Pat. No. 6,622,220 (hereinafter referred to as Yoshida '220), teaches a security-enhanced network-attached storage device. Blumenau et al. U.S. Pat. No. 7,165,152 (hereinafter referred to as Blumenau '152), teaches a method and apparatus for managing access to storage devices in a storage system with access control. Faulkner, U.S. Pat. No. 6,389,427 (hereinafter referred to as Faulkner '427), teaches a file-system performance enhancement.

Junya, U.S. Pat. No. 5,469,564 (hereinafter referred to as Junya '564), teaches a data storage device with enhanced data security. Tsuchiya, JP2000137581 (hereinafter referred to as Tsuchiya '581), teaches a storage-device control system. Hara, JP2007102761 (hereinafter referred to as Hara '761), teaches a system and method for limiting access to a storage device.

All the prior-art references cited above do not teach methods for the storage device to independently control the access to data in the storage device at a command-by-command level, and to limit access only to commands originating from privileged resident-program files.

It would be desirable to have systems and methods for limiting access, to data in a storage device, only to privileged resident-program files that have been launched from the storage device.

SUMMARY OF THE INVENTION

It is the purpose of the present invention to provide systems and methods for limiting access, to data in a storage device, only to privileged resident-program files that have been launched from the storage device.

For the purpose of clarity, several terms which follow are specifically defined for use herein. The term "RNG" is used herein to refer to a random number generator. The terms "seed sequence number" and "SSN" are used herein to refer to a random number generated by an RNG in a storage-device controller. The term "CSN" is used herein to refer to a command sequence number. The term "bus sniffing" is used herein to refer to monitoring (i.e. reading) data transferred on a hardware bus in a computing system. The bus is configured to be connected to two entities (in a specific system) that exchange data. The monitoring is performed by a third entity that is temporarily connected to the bus and that is not a part of the system.

The terms "storage-device cache" and "SDC" are used herein to refer to fast random-access volatile memory, which is accessed by the storage-device controller only, and which contains a launching-pad area, a parametertable area, and a code area. The term "storage device" is used herein to refer to a hardware device that contains at least non-volatile memory (NVM), a controller, and an SDC. The term "program file" is used herein to refer to a file residing in NVM containing a sequence of CPU commands.

The term "launching" is used herein to refer to a process of preparing a program file for execution on a host system, whereby the host system requests to read a program file from a storage device, and to write the program file content into the host-system volatile memory, in a program-process format, in order to execute the process on the host system. The term "launching pad" is used herein to refer to an area in the internal-storage volatile memory (e.g. cache) into which a program file is copied in preparation for launching, and in which some modifications can be made to the program file for the current launching.

The term "program process" is used herein to refer to a running software application originating from a specific program file. The program process is created by the operating system (OS) of the host system upon bringing a program file from NVM of the storage device to the volatile memory of the host system. The program process may contain single-session parameters that may vary between one launching of the application to another launching of the same application, such as the resident location of the program process in volatile memory, the priority of the program process, and the process ID. The present invention utilizes the ability to attach parameters to a program process. It is noted that upon launching, a program file is copied by the OS from the storage area into the launching pad, and subsequently into the host-system volatile memory for execution in order to prepare the program file to become a program process.

The term "program-file cached copy" and "PFCC" are used herein to refer to a copy of the program file that was copied into the launching pad in preparation for launching. The term "signed code" is used herein to refer to an object that includes data and a "signature". The signature is generated using the following procedure:

(1) read the data;
(2) generate a checksum using a hash algorithm (e.g. SHA-1/SHA-2); and
(2) encrypt the checksum with a private key using an asymmetric algorithm (e.g. RSA or ECC).

To make sure that the data is signed, the application that verifies the data needs to perform the following steps:

(1) read the object data;
(2) calculate a checksum using a HASH algorithm;
(3) read the object signature;
(4) decrypt the signature using a public key, usually using an asymmetric encryption core (e.g. RSA and ECC); and
(5) compare the decrypted signature and the checksum; if the comparison fails, the code is not signed; if the comparison succeeds, the code is signed.

The term "resident application" is used herein to refer to an application that is stored on a storage device and is launched from the storage device. The present invention assumes that resident applications are trusted by the storage device. The terms "privileged resident-program file" and "PRPF" are used herein to refer to a program file, signed by a storage device, that has a mechanism to identify its own program processes when the program processes send storage commands from the host system to the storage device.

The term "storage-command attachment" is used herein to refer to additional information, related to a storage command, that is sent by a host system to a storage device. A storage-command attachment can be sent prior to the storage command, after the storage command, or in reserved bits of the storage command. In some cases, the additional information can extend the length (i.e. the number of bits) of the storage command. The terms "no-operation command" and "NOP command" are used herein to refer to a storage command, sent by a host system to a storage device, that does not require any operation to be performed by the storage device. In the prior art, NOP commands are used for testing purposes, or for placing a processor into an endless loop of executing code that includes NOP commands.

The technical terms in this application, unless specifically defined, are to be used in their meaning as defined in the TCG Glossary 2004, available in https://www.trustedcomputing-group.org/groups/TCG_Glossary.pdf.

The present invention teaches a system for the identification of commands, submitted to a storage device by a host system, that originate from resident applications. A host system can run various applications. Such applications sometimes run processes intended by a user, and sometimes are malicious, unauthorized processes. Such unauthorized processes can submit commands to the storage device in a manner that resembles commands originating from resident applications. Some of the applications running on the host system may even be identical to resident applications, since an application may be launched from other sources (e.g. a network or secondary storage device).

The present invention enables a storage-device controller to monitor commands submitted by the host system in such a way that only commands originating from resident applications will be recognized as such. Commands originating from a non-resident application can be rejected by the storage device, can be limited to access only certain parts of the storage memory, or can be executed.

An essential feature of the present invention is a mechanism that checks the authenticity of every command submitted to a storage device by a host system. A basic assumption of the present invention is that resident applications will not be interrupted by other applications, and will run until properly terminated, or until the host system is powered off.

The controller of the storage device can detect when an application is launched by any of the following means:

(1) according to the identity of the partition from which the data is retrieved—applications reside in special partitions;
(2) according to the range of sectors—the storage device has a table that includes the range of all PRPF sectors (the table is updated when a new PRPF is written into storage memory);
(3) by a host-system notification—the host system notifies the storage device by a special command from the file system (i.e. the file system knows what kind of file is requested to be loaded, e.g. *.exe and *.dll); and
(4) by a communication protocol between the host system and the storage device that is a file-level protocol rather than a block-device protocol (e.g. MTP (Media Transfer Protocol by Microsoft®) as described in: http://www.directionsonmicrosoft.com/sample/DOMIS/update/2004/1 0oct/1004mpumsf_sb.htm).

According to the present invention, when the host system submits a request to launch and execute a resident application, the storage-device controller:

(1) reads the resident program file and its metadata file into the internal cache of the storage device;
(2) reads an offset address in the program file in order to implant a random number;
(3) generates a pseudo-random number using an RNG;
(4) implants an SSN in an assigned offset address in the program file; and
(5) records the random number as associated with the specific program process.

The resident application is programmed to attach a CSN to every command that the application sends to the storage device. The first CSN is derived from the SSN, and every subsequent command has a CSN that is derived from the previous CSN based on a formula. An example of a formula for deriving subsequent CSNs is $CSN_n = CSN_{n-1} + 1$. The device controller keeps track of the CSN flow, and makes sure that the flow complies with the formula. Any other application that attempts to send data-request commands to the storage device will be unable to comply with the right sequence, and therefore, will be detected.

A hostile program that somehow gains access to the SSN, to the expected CSN ($CSN_n$), and to the formula of a PRPF, will be able to counterfeit the next CSN ($CSN_{n+1}$), and submit a counterfeit data-request command to the storage device. Such a counterfeit command can only remain undetected until the resident application issues its next data-request command. When the resident application issues its next data-request command, the command will have the same associated $CSN_{n+1}$ attached. Upon detection of a repeated CSN, the device controller identifies the counterfeit command, and takes appropriate measures (e.g. denying access to the storage device, alerting the host system, and/or alerting the user).

Optionally, the resident application can be further programmed to maintain a continuous flow of commands in order to avoid "dead times" (i.e. long pauses between subsequent commands), and to reduce the time that a counterfeit command remains undetected. This can be done through periodic initiation of the program (e.g. sending a "dummy" command (NOP command) to the storage device with the next CSN attached). A counterfeit command can only exist for the short time interval between the first counterfeit command of the hostile program and the next command of the PRPF (either a NOP or data-request command). Such an interval can be as short as a few tens of milliseconds, preventing a hostile application from causing significant damage.

In another preferred embodiment of the present invention, the storage device can interrupt the PRPF (e.g. via a hardware interrupt, if the storage device is a slave device that cannot initiate transactions, or by initiation of a transaction, if the storage device is a master device (e.g. OTG (on-the-go) in USB2)). The storage device can then request the next CSN. The storage device can be programmed to interrupt the PRPF, if there is reason to suspect that a data-request command is counterfeit. In such an embodiment of the present invention, the PRPF does not overload the storage device with dummy commands unless there is a suspicion regarding the authenticity of a previous command.

It should be noted that a hacker can obtain control over the interrupt-service routine, and respond on behalf of the legitimate PRPF process. In such an instance, the hacker's response will be considered valid. However, as soon as the PRPF sends a new command, the counterfeit command will be discovered. The use of the NOP commands minimize the time that the hacker has until the counterfeit command is detected. It is assumed that the hacker cannot terminate the legitimate PRPF process; thus, sooner or later the PRPF process will send a new command, and will terminate the unauthorized party.

In a preferred embodiment of the present invention, the device controller can store a short list of symptoms that raise the suspicion of a hostile command, and poll the PRPF for a CSN whenever such a symptom is detected. A typical symptom of a hostile transaction is a sequence of read commands to a music file at a rate that is substantially exceeds a reasonable playing rate (e.g. typically 16 Kbytes per second). Such a transaction, even if it is a legal transaction and can occasionally come from the PRPF, will be suspected as an attempt to steal content, and will be marked as suspicious. When such a transaction is detected as originating from a PRPF, the controller polls the PRPF, and requests the next CSN. If the device is indeed under attack, then the reported CSN will not be the expected one. The reported CSN will be an "old" CSN that was already reported by the hostile program when the program initially intervened. Such a situation will indicate to the device that there is an attack by a hostile program.

Clearly, real-time bus sniffing (i.e. capturing and using a CSN) enables a hacker to deceive the storage device only until the next valid transaction (i.e. command or series of commands) of the PRPF, offering the hacker a very limited window of opportunity for attack. At the same time, imitation is not possible because the seed (SSN) in the application is erased upon powering off. Upon powering on, the application is launched with a new seed, and the previous sequence is no longer valid.

Therefore, according to the present invention, there is provided for the first time a method for limiting access to a storage device, the method including the steps of: (a) providing a host system and a storage device, wherein the storage device has a privileged resident-program file; (b) creating a program-file cached copy of the privileged resident-program file; (c) generating a random seed sequence number; (d) implanting the seed sequence number in the program-file cached copy; (e) registering the program-file cached copy with the seed sequence number in the storage device; (f) converting the program-file cached copy with the seed sequence number to a program process in the host system, and (g) confirming, by the storage device, that storage commands, arriving from the host system, originated from the program process.

Preferably, the step of confirming includes: (i) creating, by the program process, a unique command sequence number for each storage command; (ii) attaching a respective command sequence number to each storage command; (iii) deriving, by the storage device, an expected command sequence number for an expected storage command; (iv) comparing, by the storage device, the respective command sequence number to the expected command sequence number; and (v) executing the storage command only upon a match between the respective command sequence number and the expected command sequence number.

Most preferably, the step of confirming further includes: (vi) reporting an arrival of an unexpected command sequence number.

Most preferably, the step of confirming further includes: (vi) measuring an elapsed time since an arrival of a last storage command; and (vii) generating, by the program process, a no-operation command having the expected command sequence number upon the elapsed time exceeding a predetermined time interval following the last storage command.

According to the present invention, there is provided for the first time a method for communicating with a storage device configured to store signed program files, the method including the steps of: (a) generating, by a program process, a respective command number associated with a process command; (b) issuing, by the program process, the process command with the respective command number to the storage device; and (c) according to the respective command number, verifying, by the storage device, whether the process command originated from a trusted program process launched from the program files stored in the storage device.

Preferably, the step of verifying includes: (i) generating, by the storage device, a respective initial command number associated with a requested program file; and (ii) attaching, by the storage device, the respective initial command number to a copy of the requested program file.

Most preferably, the step of verifying further includes: (iii) according to a value of the respective initial command number, obtaining, by the storage device, a subsequent command number; and (iv) comparing, by the storage device, the value of the respective initial command number with a value of the subsequent command number.

Preferably, the step of verifying includes: (i) polling, by the storage device, for a subsequent command number.

Preferably, the method further includes the step of: (d) reporting, by the storage device, an alert signal that the process command did not originate from the trusted program process launched from the program files stored in the storage device.

Preferably, the process command includes a storage command.

Preferably, the process command includes a no-operation command.

Most preferably, the no-operation command is generated after a pre-determined time interval elapsed following the step of issuing.

According to the present invention, there is provided for the first time a storage device configured to identify whether an application, running on a host system and accessing the storage device, was loaded from the storage device.

According to the present invention, there is provided for the first time a storage device configured to allow access to data, stored in the storage device, exclusively to application programs loaded from the storage device.

According to the present invention, there is provided for the first time a computing system including: (a) a host system having a volatile memory for executing applications; (b) a storage device having at least one privileged resident-program file and a program launching pad; (c) a mechanism for implanting an seed sequence number in a program-file cached copy; and (d) a mechanism for comparing an attached command sequence number of a storage command with an expected command sequence number derived by the storage device.

According to the present invention, there is provided for the first time a computing system including: (a) a first logic module operative to generate a respective command number associated with a process command; and (b) a storage device including: (i) a non-volatile memory operative to store program files being signed by the storage device; and (ii) a controller operative, according to the respective command number, to verify whether the process command originated from a program process launched from a program file stored in the non-volatile memory.

Preferably, the storage device further includes: (iii) a second logic module operative: (A) to seed a unique parameter set associated with a requested program file; and (B) to generate a plurality of command numbers according to the parameter set.

Most preferably, the second logic module includes a random number generator.

Preferably, the controller is further operative to poll the storage device for a subsequent command number.

Preferably, the controller is further operative to report an alert signal that the process command did not originate from the program process launched from a program file stored in the non-volatile memory.

Preferably, the process command includes a storage command.

Preferably, the process command includes a no-operation command.

Most preferably, the first logic module is operative to generate the no-operation command after a pre-determined time interval elapsed following issuance of the process command.

According to the present invention, there is provided for the first time a computing system including: (a) an associating mechanism for generating a respective command number associated with a process command; and (b) a storage device including: (i) a non-volatile memory for storing program files being signed by the storage device; and (ii) a verifying mechanism for verifying whether the process command originated from a program process launched from a program file stored in the non-volatile memory, according to the respective command number of the process command.

Preferably, the storage device further includes: (iii) a seeding mechanism for seeding a unique parameter set associated with a requested program file; and (iv) a generating mechanism for generating a plurality of command numbers according to the parameter set.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to systems and methods for limiting access, to data in a storage device, only to privileged resident-program files that have been launched from the storage device. The principles and operation for limiting access only to privileged resident-program that have been launched from a storage device, according to the present invention, may be better understood with reference to the accompanying description and the drawings.

Figure 1:
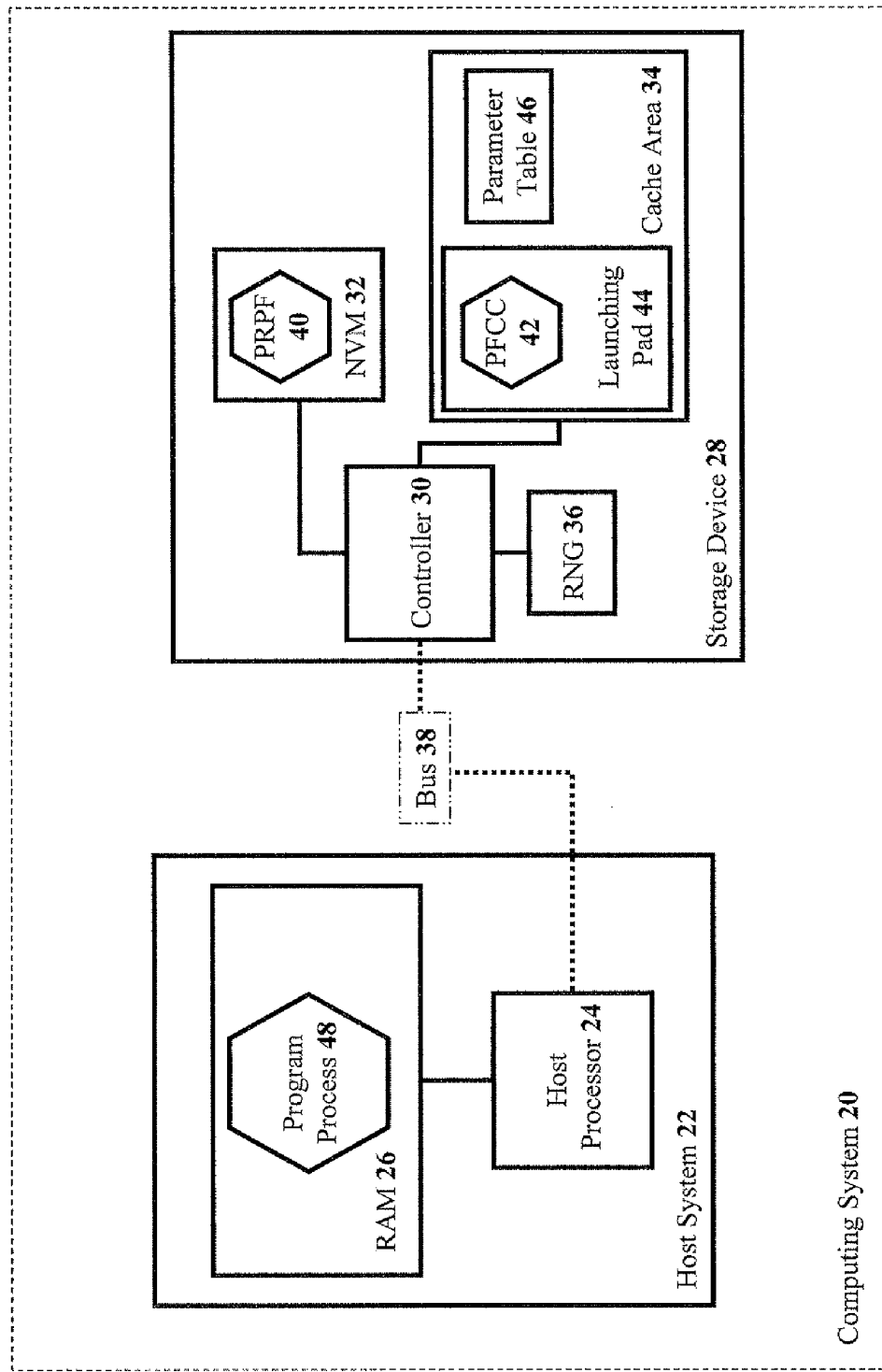
FIG. 1 is a simplified schematic block diagram of a computing system, according to preferred embodiments of the present invention.

Referring now to the drawings, FIG. 1 is a simplified schematic block diagram of a computing system, according to preferred embodiments of the present invention. A computing system 20 having a host system 22, including a host processor 24 and a RAM 26, and a storage device 28, including a controller 30, an NVM 32, a cache area 34 (i.e. volatile memory), and a RNG 36, is shown in FIG. 1. Host system 22 and storage device 28 are connected via a bus 38 (e.g. a universal serial bus (USB)). A PRPF 40 resides in NVM 32 of storage device 28.

When host processor 24 commands storage device 28 to launch PRPF 40, controller 30 copies PRPF 40 into a PFCC 42 that resides in a launching pad 44 of cache area 34. Controller 30 then obtains a random number from RNG 36, and plants the random number (which serves as the SSN) in PFCC 42. Controller 30 then updates a parameter table 46 residing in cache area 34, and sends PFCC 42 to host processor 24 via bus 38. Host processor 24 stores PFCC 42 in a program process 48 in RAM 26 of host system 22. Program process 48, when executed by host processor 24, performs its functions, and sends commands to storage device 28. These commands are used to identify the process as a "resident" and "trusted" application (originating from a PRPF).

RNG 36 is a software module used regularly in gambling/chance applications. Such RNG modules typically reside in a computer chip placed inside a slot machine by the manufacturer, for example. In on-line gambling/chance scenarios, the RNG is a software module in a game server. The purpose in both examples is identical; that is, RNG modules are configured to randomly select hundreds of numbers and symbols every second, faster than a player can pull a handle or click a spin button. An RNG module continues to work even when the gambling/chance application is idle.

Figure 2:
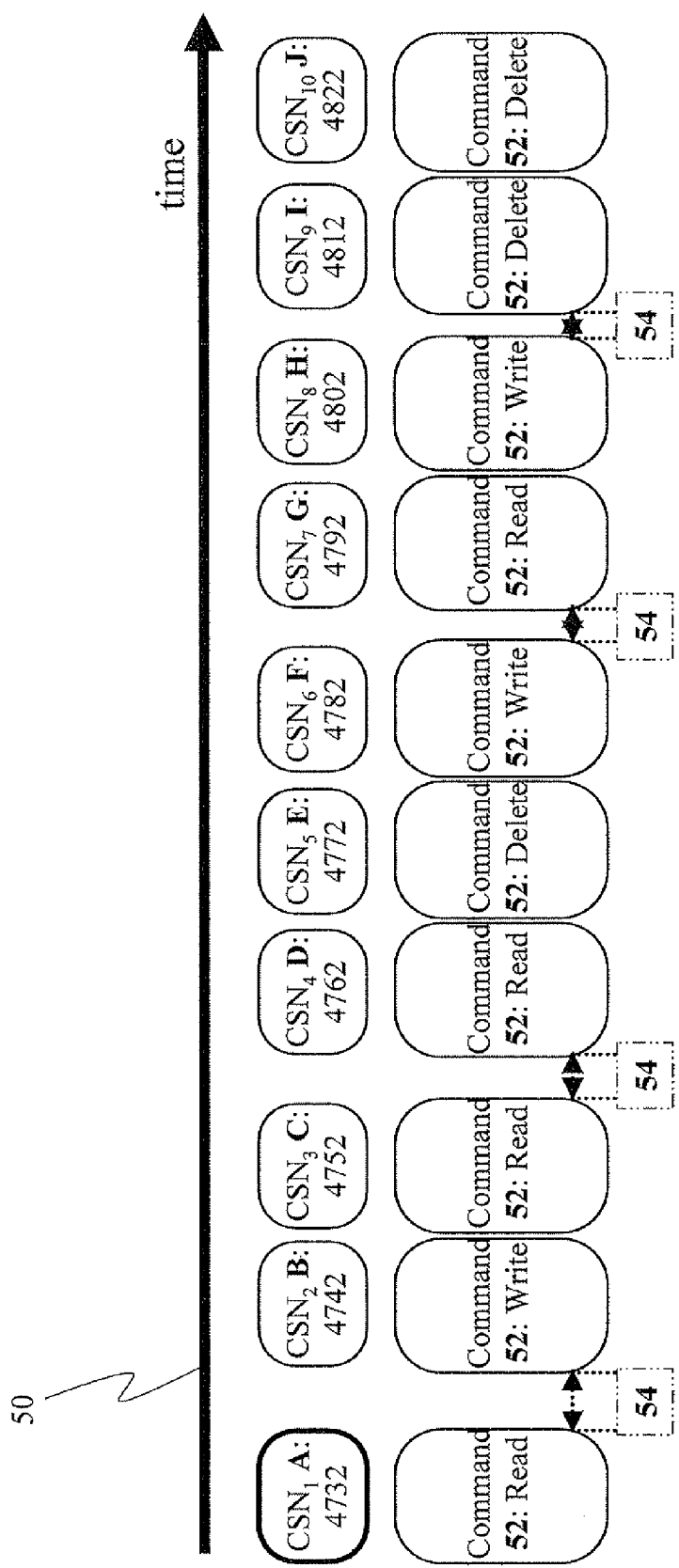
FIG. 2 shows a timeline of commands sent by an authenticated resident application (PRPF), according to preferred embodiments of the present invention.

FIG. 2 shows a timeline of commands sent by a program process of an authenticated resident application (PRPF), according to preferred embodiments of the present invention.

A timeline 50 is shown in FIG. 2 starting from the left and progressing to the right. CSNs are attached to commands as the commands arrive in sequence. For example, a first $CSN_1$ A (4732) is attached to the first command in time, and a $CSN_2$ B (4742) is attached to the next command in time. PRPF 40 is programmed to attach a CSN to every storage command that PRPF 40 sends to storage device 28. Each CSN is derived from the previous CSN by applying a formula that is known both to PRPF 40 and to controller 30. $CSN_1$ A, the first CSN, is derived from the SSN using the formula.

FIG. 2 shows sequential storage commands 52 (e.g. read, write, and delete) with their attached $CSN_n$s A-J. In this example, the formula that derives the CSN is a simple formula: $CSN=CSN_{n-1}+10$; therefore, starting with CSN, A equal to 4732, the subsequent $CSN_n$s B-J are 4742, 4752, 4762, 4772, 4782, 4792, 4802, 4812, and 4822, respectively. Controller 30 keeps track of the CSN sequence, and makes sure that the sequence complies with the formula $CSN_n=CSN_{n-1}+10$. Any other application that incidentally sends storage-request commands to storage device 28 will not comply with the sequence, and will be detected by controller 30.

If a hostile application gains access to the CSN sequence of the PRPF, and attempts to "recycle" the CSNs for its own storage-request commands (i.e. counterfeit commands), the CSNs will not comply with the correct sequence. Controller 30 will expect new CSNs, and will not accept old CSNs. In effect, the CSNs are expendable, and can only be used once.

A sophisticated hostile application that gains access to both the expected CSN ($CSN_n$) and the formula ($CSN_n=CSN_{n-1}+10$) of a PRPF will be able to counterfeit the next $CSN_n$ ($CSN_{n+1}=CSN_n+10$). Therefore, such a hostile application will be able submit a counterfeit command to storage device 28. Such a counterfeit command can only remain undetected until program process 48 issues its next storage command 52. When program process 48 issues its next storage command 52, program process 48 will also use the same $CSN_{n+1}$. Upon detection of a repeated CSN, controller 30 will detect the counterfeit command, and take appropriate measures (e.g. denying access to the storage device, alerting the host system, and/or alerting the user).

Note the presence of irregular time intervals 54 between commands 52 in FIG. 2. If program process 48 is "silent" for an extended period of time, a hostile application can obtain the current and/or expected CSN and the formula of program process 48. The hostile application can then use the CSNs and formula for longer periods of time because controller 30 will not detect a counterfeit command until the next valid command 52 of program process 48 is received, increasing the potential for damage due to an attack.

It is noted that a similar scheme to the one described above would apply to the more general concept of a process command in place of a storage command. That is, a command, issued by program process 48, that does not perform the common actions mentioned above (i.e. read, write, and delete) on the storage device.

Figure 3:
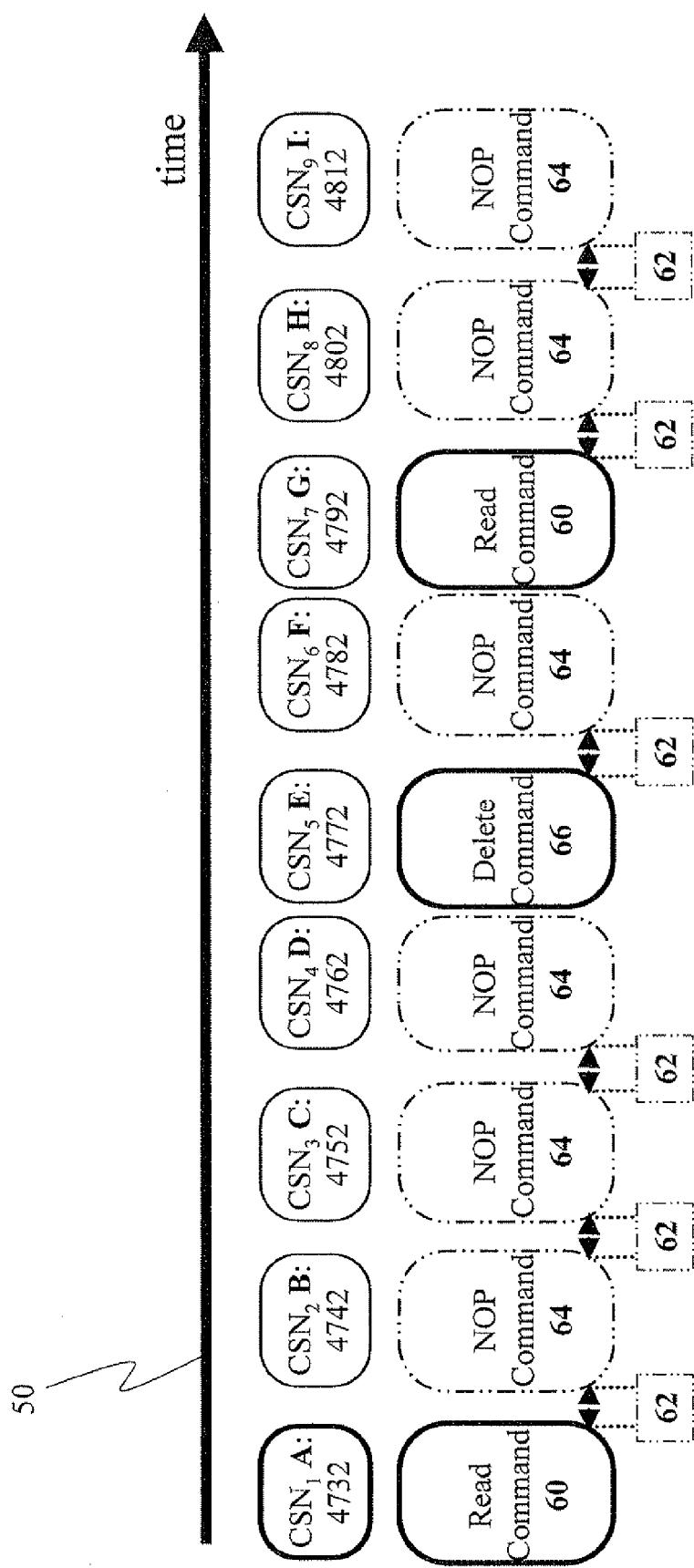
FIG. 3 shows a timeline of commands sent by an authenticated resident application (PRPF) containing NOP commands, according to preferred embodiments of the present invention.

FIG. 3 shows a timeline of commands sent by a program process of an authenticated resident application (PRPF) containing NOP commands, according to preferred embodiments of the present invention. Following a real storage command (with the appropriate CSN attached), an NOP command is sent periodically and frequently with an appropriate CSN. Such a procedure solves the security problem described above by decreasing the time that controller 30 can be deceived by a counterfeit command.

FIG. 3 shows a read command 60 with $CSN_1$ A (4732) attached. After a fixed time interval 62, program process 48 sends an NOP command 64 with $CSN_2$ B (attached with the value 4742, derived from the formula $CSN_2=CSN_1+10$). After another time interval 62, another NOP command 64 is sent with $CSN_3$ C (4752) attached. In the absence of a new storage command, program process 48 continues to send NOP commands with the relevant CSNs at regular intervals. Storage device 28 then sends, after another time interval 62, another NOP command 64 with $CSN_4$ D (4762) attached.

Such a stream of NOP commands with attached CSNs is interrupted when PRPF 40 sends a real storage-request command (not an NOP command). For example, when a delete command 66 with $CSN_5$ E (4772) attached is sent, the commands are temporarily halted. Following delete command 66 (with $CSN_5$ E (4772) attached), after another time interval 62, program process 48 resumes sending periodic NOP commands 64 with the relevant CSNs. Program process 48 sends another NOP command 64 with $CSN_6$ F (4782). When program process 48 sends another read command 60 with $CSN_7$ G (4792) to storage device 28, the NOP command stream is paused again.

Following read command 60 (with $CSN_7$ G (4792) attached), after another time interval 62, program process 48 resumes sending periodic NOP commands 64. program process 48 first sends another NOP command 64 with $CSN_8$ H (4802), and then after another time interval 62, send another NOP command 64 with $CSN_9$ I (4812) attached. Periodic NOP commands 64 continue until program process 48 sends a real storage command.

Figure 4:
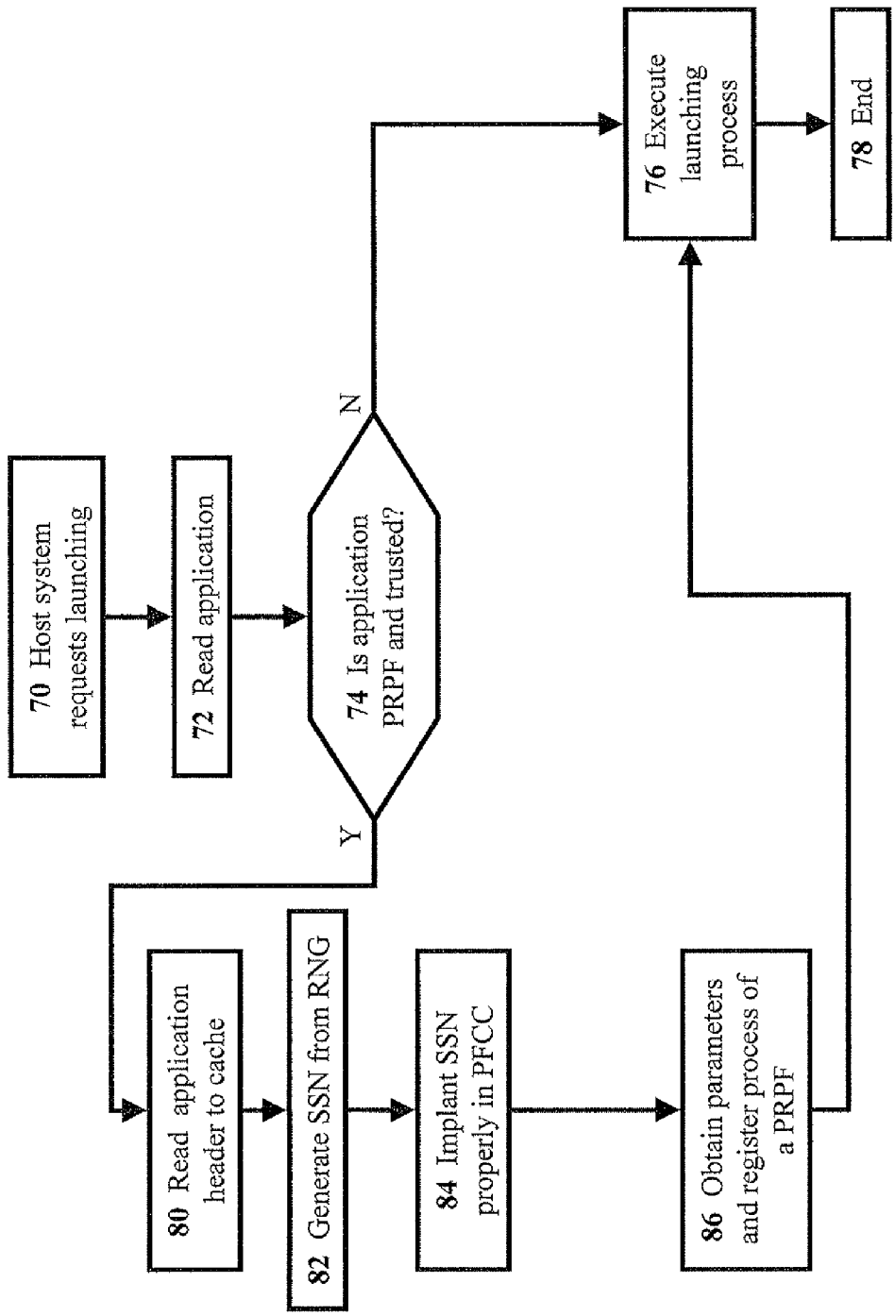
FIG. 4 is a simplified flowchart of the launching process, according to preferred embodiments of the present invention.

FIG. 4 is a simplified flowchart of the launching process, according to preferred embodiments of the present invention. Host system 22 requests to read (i.e. load) an application (i.e. a program file) from storage device 28 to a volatile memory of host system 22 (connected to host system 22) in order to execute the application (Step 70). Storage device 28 gets the read command from host system 22, and reads the application from NVM 32 into PFCC 42 in launching pad 44 (Step 72). Controller 30 verifies whether the application is a PRPF 40 (i.e. signed by storage device 28 for identifying its processes in host system 22), and is trusted (Step 74).

The verification is performed by reading the application signature resident in NVM 32, and making sure that the application is signed by the secret key of controller 30, which can be read only (but not written) by controller 30. Even the code executed from cache area 34 of storage device 28 cannot access the secret key. If controller 30 finds that the application is not a PRPF 40, controller 30 responds to the launching request of host system 22 by providing the application data to host system 22, copying the data to RAM 26, and executing the data (Step 76). Then, the launching process comes to an end (Step 78).

If controller 30 finds the application is a PRPF 40, controller 30 reads the application header (i.e. PFCC 42) into launching pad 44 in cache area 34 of storage device 28 (Step 80). Controller 30 then obtains a random number from RNG 36 (Step 82), and plants the random number in PFCC 42 (Step 84). The formula and the SSN are selected, using encryption methods known in the art, so as to minimize the probability that the same CSN can be generated by two applications or at two instances of time by the same application.

Controller 30 creates a new entry for PRPF 40 in parameter table 46 residing in cache area 34 (Step 86). Parameter table 46 includes parameters for identifying and managing PRPF storage-access permissions. These parameters are received from the relevant application header read into cache area 34 (Step 80), and the SSN received from RNG 36 (Step 82). These parameters include:

(1) an SSN parameter;
(2) an expected-CSN parameter, which is initially $CSN_1$ (the first CSN is derived from the SSN itself by a progression formula);
(3) the progression formula that defines the next CSN based on the expected-CSN parameter (e.g. $CSN_n = CSN_{n-1} + 10$); and
(4) a set of storage-access permission rules (received from the application header (Step 80)) that indicates the application storage-access permissions.

Controller 30 then responds to the launching request by providing the application data to host system 22, copying the data to RAM 26, and executing the data (Step 76). Then, the launching process comes to an end (Step 78).

Figure 5:
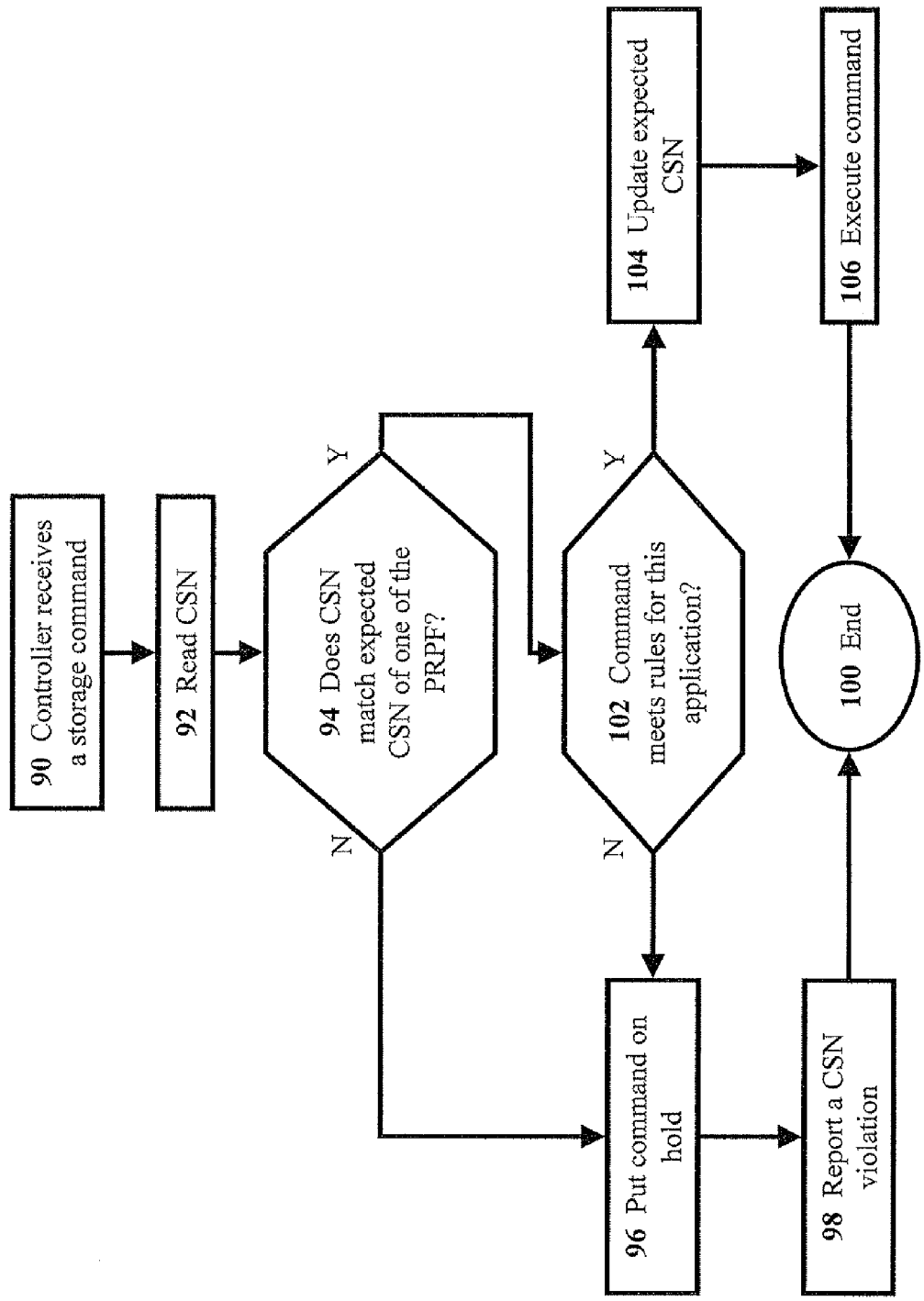
FIG. 5 is a simplified flowchart of the run-time processing of storage commands, according to preferred embodiments of the present invention.

FIG. 5 is a simplified flowchart of the run-time processing of storage commands, according to preferred embodiments of the present invention. FIG. 5 shows the process steps performed by a storage device when the device receives commands that include a CSN from an application that is executed by the host system. Controller 30 receives a storage command from an application running on host system 22 (Step 90). Controller 30 reads the CSN attached to the storage command (Step 92). Controller 30 verifies whether the received CSN matches one of the expected CSNs located in the PRPF entry in parameter table 46 (Step 94).

If the received CSN does not match one of the expected CSNs, controller 30 puts the command on hold (i.e. does not perform the storage command) (Step 96). The host application is interrupted due to submission of an incorrect CSN, a CSN violation is reported (Step 98), and the process comes to an end (Step 100).

If the received CSN matches one of the expected CSNs, controller 30 identifies the PRPF entry in parameter table 46. Then, controller 30 checks whether the storage command meets the storage-access permission rules that are located in the corresponding PRPF entry (Step 102). If the storage command meets the relevant storage-access permission rules, then controller 30 derives the next CSN according to the progression formula (Step 104). Only then, does controller 30 execute the storage command (Step 106), and the process comes to an end (Step 100).

If the storage command does not meet the relevant storage-access permission rules, controller 30 puts the command on hold (Step 96). If the rules are not satisfied, it indicates that a hostile application may have gained access to the CSN sequence of PRPF 40, and may be attempting to counterfeit a valid command. The host application is interrupted due to submission of an incorrect CSN, a CSN violation is reported (Step 98), and the process comes to an end (Step 100).

Figure 6:
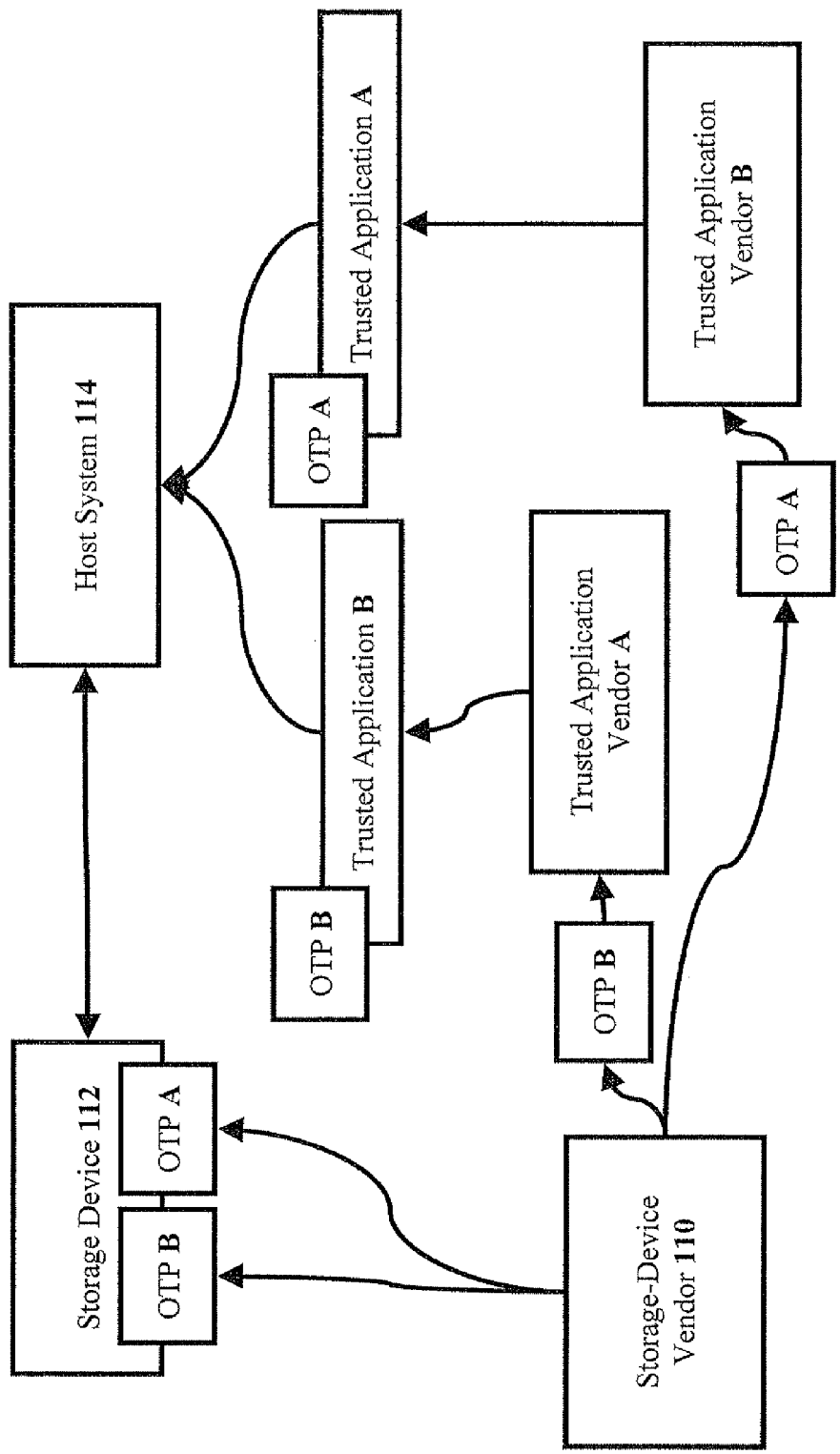
FIG. 6 is a simplified schematic block diagram showing an application, which is not launched from a storage device, is confirmed by the storage device as valid, according to preferred embodiments of the present invention.

FIG. 6 is a simplified schematic block diagram showing an application, which is not launched from a storage device, is confirmed by the storage device as valid, according to preferred embodiments of the present invention. A trusted storage-device vendor 110 creates a storage device 112, and equips storage device 112 with a mechanism for checking if storage commands are valid as described above. Storage device 112 is connected to a host system 114. Applications that are launched from storage device 112 are verified as described above.

Storage-device vendor 110 authorizes two trusted application vendors A and B to create, at any given time before or after the delivery of storage device 112, applications for host system 114 that will be confirmed and verified by storage device 112. Storage-device vendor 110 implants in storage device 112 any number of one-time-pads (OTP), which are unique lists of random numbers. An OTP A and an OTP B are implanted in storage device 112 before leaving storage-device vendor 110.

OTP A is also delivered to application vendor A, and OTP B is also delivered to application vendor B. Application vendors A and B implant OTP A and OTP B in trusted applications A and B, respectively, during application development. When application A with implanted OTP A (or application B with implanted OTP B) is loaded into host system 114, application A uses OTP A as a sequence of CSNs, sending one CSN with every storage command to host system 114 (similar to the schema described above). Storage device 112 compares each CSN with the corresponding number from OTP A in application A, and confirms the validity of application A (and commands issued by application A).

The above description with regard to FIG. 6 shows how the mechanism of the present invention can be applied to identity commands originating from program processes of valid applications, whether the applications are launched from the storage device or not, as long as the applications are able to deliver a valid sequence of CSNs while accessing the storage device.

While the invention has been described with respect to a limited number of embodiments, it will be appreciated that many variations, modifications, and other applications of the invention may be made.

What is claimed is:

1. A method for controlling access to a storage device, the method comprising:
   in a storage device having a program file, the storage device:
   creating a program-file cached copy of said program file;
   generating a random seed sequence number;
   implanting said seed sequence number in said program-file cached copy;
   registering said program-file cached copy with said seed sequence number in said storage device;
   transmitting to a host system said program-file cached copy with said seed sequence number for conversion to a program process in said host system, and
   confirming that storage commands, arriving from said host system, originated from said program process.

2. The method of claim 1, wherein said step of confirming includes:
   receiving from said program process, a respective command sequence number attached to each said storage command;
   deriving, by said storage device, an expected command sequence number for an expected storage command;
   comparing, by said storage device, said respective command sequence number to said expected command sequence number; and
   executing each said storage command only upon a match between said respective command sequence number and said expected command sequence number.

3. The method of claim 2, wherein said step of confirming further includes:
   reporting an arrival of an unexpected command sequence number when said respective command sequence number and said expected command sequence number do not match.

4. The method of claim 2, wherein said step of confirming further includes:
   receiving from said program process, a no-operation command having said expected command sequence number upon an elapsed time since an arrival of a last storage command exceeding a predetermined time interval.

5. A method for communicating with a storage device configured to store signed program files, the method comprising the storage device:
receiving a process command from a program process of a host, said process command having a respective command number generated by said program process; and
according to said respective command number, verifying whether said process command originated from a trusted program process launched from the program files stored in the storage device.

6. The method of claim 5, wherein said step of verifying includes:
generating, by the storage device, a respective initial command number associated with a requested program file; and
attaching, by the storage device, said respective initial command number to a copy of said requested program file.

7. The method of claim 6, wherein said step of verifying further includes:
according to a value of said respective initial command number, obtaining, by the storage device, a subsequent command number; and
comparing, by the storage device, said value of said respective initial command number with a value of said subsequent command number.

8. The method of claim 5, wherein said step of verifying includes:
polling, by the storage device, for a subsequent command number.

9. The method of claim 5, the method further comprising the step of:
reporting, by the storage device, an alert signal that said process command did not originate from said trusted program process launched from the program files stored in the storage device.

10. The method of claim 5, wherein said process command includes a storage command.

11. The method of claim 5, wherein said process command includes a no-operation command.

12. The method of claim 11, wherein said no-operation command is received after a pre-determined time interval elapsed following said step of receiving the process command.

13. A storage device comprising:
a non-volatile memory operative to store program files signed by the storage device; and
a controller operative to: receive a process command from a host, the process command having a host-generated command number; and
verify whether said process command originated from a program process launched from a program file stored in said non-volatile memory based on said host-generated command number.

14. The storage device of claim 13, wherein said storage device further includes:
a logic module operative:
to seed a unique parameter set associated with a requested program file; and
to generate a plurality of command numbers according to said parameter set.

15. The storage device of claim 14, wherein said logic module includes a random number generator.

16. The storage device of claim 13, wherein said controller is further operative to poll said storage device for a subsequent command number.

17. The storage device of claim 13, wherein said controller is further operative to report an alert signal that said process command did not originate from said program process launched from a program file stored in said non-volatile memory.

18. The storage device of claim 13, wherein said process command includes a storage command.

19. The storage device of claim 13, wherein said process command includes a no-operation command.

20. The storage device of claim 19, wherein said storage device receives said no-operation command after a pre-determined time interval has elapsed following issuance of said process command.

21. A storage device comprising:
a non-volatile memory for storing program files; and
a controller, wherein the controller is configured to, at a given time:
receive a host request for a program file;
create a program-file cached copy of said requested program file;
generate a random seed sequence number;
implant said seed sequence number in said program-file cached copy;
register said program-file cached copy with said seed sequence number in said storage device;
transmit to a host system said program-file cached copy with said seed sequence number for conversion to a program process in said host system, and
verify whether a process command originated from the program process based on a respective command number received with said process command.

22. A method for controlling access to a storage device, the method comprising:
in said storage device having a program file, the storage device:
creating a program-file cached copy of said program file;
generating a random seed sequence number;
implanting said seed sequence number in said program-file cached copy;
registering said program-file cached copy with said seed sequence number in said storage device; and
transmitting to a host system said program-file cached copy with said seed sequence number for conversion to a program process in said host system, wherein process commands subsequently received from the program process are verifiable as originating from a trusted program process launched from the program file stored in the storage device.

23. A storage device comprising:
a non-volatile memory; and
a controller, wherein the controller is configured to, at a given time:
receive a host request for a program file stored in the storage device;
create a program-file cached copy of said requested program file;
generate a random seed sequence number;
implant said seed sequence number in said program-file cached copy;
register said program-file cached copy with said seed sequence number in said storage device; and
transmit to a host system said program-file cached copy with said seed sequence number for conversion to a program process in said host system, wherein process commands subsequently received from the program process are verifiable as originating from a trusted program process launched from the program file stored in the storage device.

* * * * *